United States Patent
Lee et al.

(10) Patent No.: US 11,290,533 B2
(45) Date of Patent: Mar. 29, 2022

(54) NETWORK STORAGE DEVICE STORING LARGE AMOUNT OF DATA

(71) Applicant: SAMSUNG ELECTRONICS CO., LTD., Suwon-si (KR)

(72) Inventors: Changduck Lee, Hwaseong-si (KR); Seungyeop Shin, Seoul (KR); Kyungbo Yang, Hwaseong-si (KR); Hwaseok Oh, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 93 days.

(21) Appl. No.: 16/196,941

(22) Filed: Nov. 20, 2018

(65) Prior Publication Data
US 2019/0320020 A1    Oct. 17, 2019

(30) Foreign Application Priority Data
Apr. 17, 2018   (KR) .................... 10-2018-0044420

(51) Int. Cl.
*H04L 29/08*     (2006.01)
*H04L 67/1097*   (2022.01)
*G06F 12/02*     (2006.01)
*H04L 41/0226*   (2022.01)
*H04L 49/104*    (2022.01)
*H04L 49/351*    (2022.01)
(Continued)

(52) U.S. Cl.
CPC ...... *H04L 67/1097* (2013.01); *G06F 12/0246* (2013.01); *H04L 41/0226* (2013.01); *H04L 49/108* (2013.01); *H04L 49/351* (2013.01); *H04L 49/356* (2013.01); *G06F 2212/7201* (2013.01); *H04L 69/08* (2013.01)

(58) Field of Classification Search
CPC ............ H04L 67/1097; H04L 41/0226; H04L 49/108; H04L 49/351; H04L 49/356; H04L 69/08; G06F 12/0246; G06F 2212/7201
USPC .......................................................... 709/212
See application file for complete search history.

(56) References Cited

U.S. PATENT DOCUMENTS 6,768,163 B2    7/2004  Tanaka et al.
7,752,381 B2 *  7/2010  Wong .................. G06F 12/0246
                                                711/103
(Continued)

FOREIGN PATENT DOCUMENTS

EP              3217270 A1    9/2017
KR         1020090097486 A    9/2009
(Continued)

*Primary Examiner* — Joseph L Greene
(74) *Attorney, Agent, or Firm* — Volentine, Whitt & Francos, PLLC

(57) ABSTRACT

A network storage device connected with a network fabric includes a network storage controller that performs interfacing with the network fabric and translates and processes a command provided through the network fabric, and a nonvolatile memory cluster that exchanges data with the network storage controller under control of the network storage controller. The nonvolatile memory cluster includes a first nonvolatile memory array connected with the network storage controller through a first channel, a nonvolatile memory switch connected with the network storage controller through a second channel, and a second nonvolatile memory array communicating with the network storage controller under control of the nonvolatile memory switch.

16 Claims, 11 Drawing Sheets

(51) Int. Cl.
*H04L 49/356* (2022.01)
*H04L 69/08* (2022.01)

(56) References Cited

U.S. PATENT DOCUMENTS

| | | |
|---|---|---|
| 8,775,718 B2 | 7/2014 | Kanevsky et al. |
| 9,250,687 B1 | 2/2016 | Aswadhati |
| 9,430,412 B2 | 8/2016 | Huang |
| 9,459,957 B2 | 10/2016 | Sella et al. |
| 9,727,503 B2 | 8/2017 | Kagan et al. |
| 9,767,058 B2 | 9/2017 | Huang |
| 2006/0101130 A1* | 5/2006 | Adams .................. H04L 67/327 709/218 |
| 2014/0195634 A1* | 7/2014 | Kishore .............. H04L 67/1097 709/213 |
| 2016/0127492 A1 | 5/2016 | Malwankar et al. |
| 2016/0255740 A1 | 9/2016 | Ping et al. |
| 2016/0274794 A1 | 9/2016 | Yoon |
| 2017/0149920 A1 | 5/2017 | Sammatshetti |
| 2017/0177222 A1* | 6/2017 | Singh .................. G06F 9/45558 |
| 2017/0255583 A1 | 9/2017 | Shih |
| 2017/0286363 A1* | 10/2017 | Joshua .............. G06F 15/17331 |
| 2018/0081558 A1 | 3/2018 | Ish et al. |
| 2018/0089116 A1 | 3/2018 | Park et al. |
| 2018/0095915 A1* | 4/2018 | Prabhakar ............... G06F 9/455 |
| 2019/0114279 A1* | 4/2019 | Shih ...................... G06F 3/0607 |

FOREIGN PATENT DOCUMENTS

| | | |
|---|---|---|
| KR | 1020160111124 A | 9/2016 |
| WO | WO2018004996 A1 | 1/2018 |

* cited by examiner

NETWORK STORAGE DEVICE STORING LARGE AMOUNT OF DATA

CROSS-REFERENCE TO RELATED APPLICATIONS

A claim of priority under 35 U.S.C. § 119 is made to Korean Patent Application No. 10-2018-0044420 filed on Apr. 17, 2018, in the Korean Intellectual Property Office, the entirety of which is hereby incorporated by reference.

BACKGROUND

The present disclosure herein relates to semiconductor memory devices, and more particularly to network storage devices storing a large amount of data.

Solid state drive (hereinafter referred to as SSD) is an example of a flash memory based mass storage device. The use of SSDs has recently diversified as the demand for mass storage has increased. For example, SSDs may be characterized as subdivided into SSDs implemented for use as servers, SSDs implemented for client use, and SSDs implemented for data centers, among various other implementations. An SSD interface is used to provide the highest speed and reliability suitable for the implementation. For the purpose of satisfying the requirement of high speed and reliability, the nonvolatile memory express (NVMe) interface specification which is based on Serial Advanced Technology Attachment (SATA), Serial Attached Small Component Interface (SAS), or Peripheral Component Interconnect Express (PCIe) has been actively developed and applied.

Currently, SSD interfaces that enable ease of expandability in systems such as large-capacity memory centers are actively being developed. In particular, an NVMe over fabrics (NVMe-oF) specification is actively being developed as a standard for mounting an SSD on a network fabric such as an Ethernet switch. The NVMe-oF supports an NVMe storage protocol through extensive storage networking fabrics (e.g., an Ethernet, a Fibre Channel™, and InfiniBand™).

The NVMe storage protocol is also applied to an NVMe SSD. Accordingly, an interface of storage including an NVMe SSD translates a protocol for a network fabric into the NVMe-oF protocol or has a function of a data buffer. However, in this case, since there is a need for protocol translation corresponding to a plurality of protocol layers, an increase in latency is inevitable.

Accordingly, to reduce latency and make capacity expansion easy, instead of using an NVMe SSD, there is a need for a technology for using a nonvolatile memory device or a nonvolatile memory array as a storage medium and performing multi-protocol translation efficiently.

SUMMARY

Embodiments of the inventive concepts provide an Ethernet storage device for simplifying a controller structure of a network storage device and providing ease of expansion.

Embodiments of the inventive concepts provide a network storage device connected with a network fabric. The network storage device includes a network storage controller that performs interfacing with the network fabric, and translates and processes a command provided through the network fabric; and a nonvolatile memory cluster that exchanges data with the network storage controller under control of the network storage controller. The nonvolatile memory cluster includes a first nonvolatile memory array connected with the network storage controller through a first channel, a nonvolatile memory switch connected with the network storage controller through a second channel, and a second nonvolatile memory array communicating with the network storage controller under control of the nonvolatile memory switch.

Embodiments of the inventive concepts further provide a network storage device that includes a network storage controller that translates a first command provided through a network switch into a second command for controlling a nonvolatile memory and outputs the second command by using an interface; and a nonvolatile memory cluster including the nonvolatile memory and that stores write data depending on the second command output from the network storage controller or outputs stored data to the storage controller. The network storage controller includes one or more external computing devices that perform an operation for the nonvolatile memory cluster based on the second command.

Embodiments of the inventive concept still further provide a network storage device including a network storage controller that translates a first command provided from a network fabric and having a network transmission format into a second command having a format for controlling nonvolatile memory devices; a first switch controller that receives the second command from the network storage controller over a first channel; and a first plurality of raw NAND flash memory devices connected to the first switch controller over a second channel. The first switch controller accesses the first plurality of raw NAND flash memory devices responsive to the second command and maps an address provided from the network storage controller onto the first plurality of raw NAND flash memory devices.

BRIEF DESCRIPTION OF THE FIGURES

The above and other objects and features of the inventive concepts will become apparent from the following detailed description taken in view of the accompanying drawings.

DETAILED DESCRIPTION

As is traditional in the field of the inventive concepts, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the inventive concepts. Likewise, the blocks of the embodiments may be physically combined into more complex blocks without departing from the scope of the inventive concepts.

In the description that follows, a solid state drive (SSD) using a flash memory device will be used as an example of a storage device for describing features and functions of the inventive concepts. However, one skilled in the art should easily understand other merits and performance of the inventive concepts depending on the contents disclosed here. The inventive concepts may be implemented or applied through other embodiments. In addition, the detailed description may be changed or modified according to applications without departing from the scope and spirit, and any other purposes of the inventive concepts.

Figure 1:
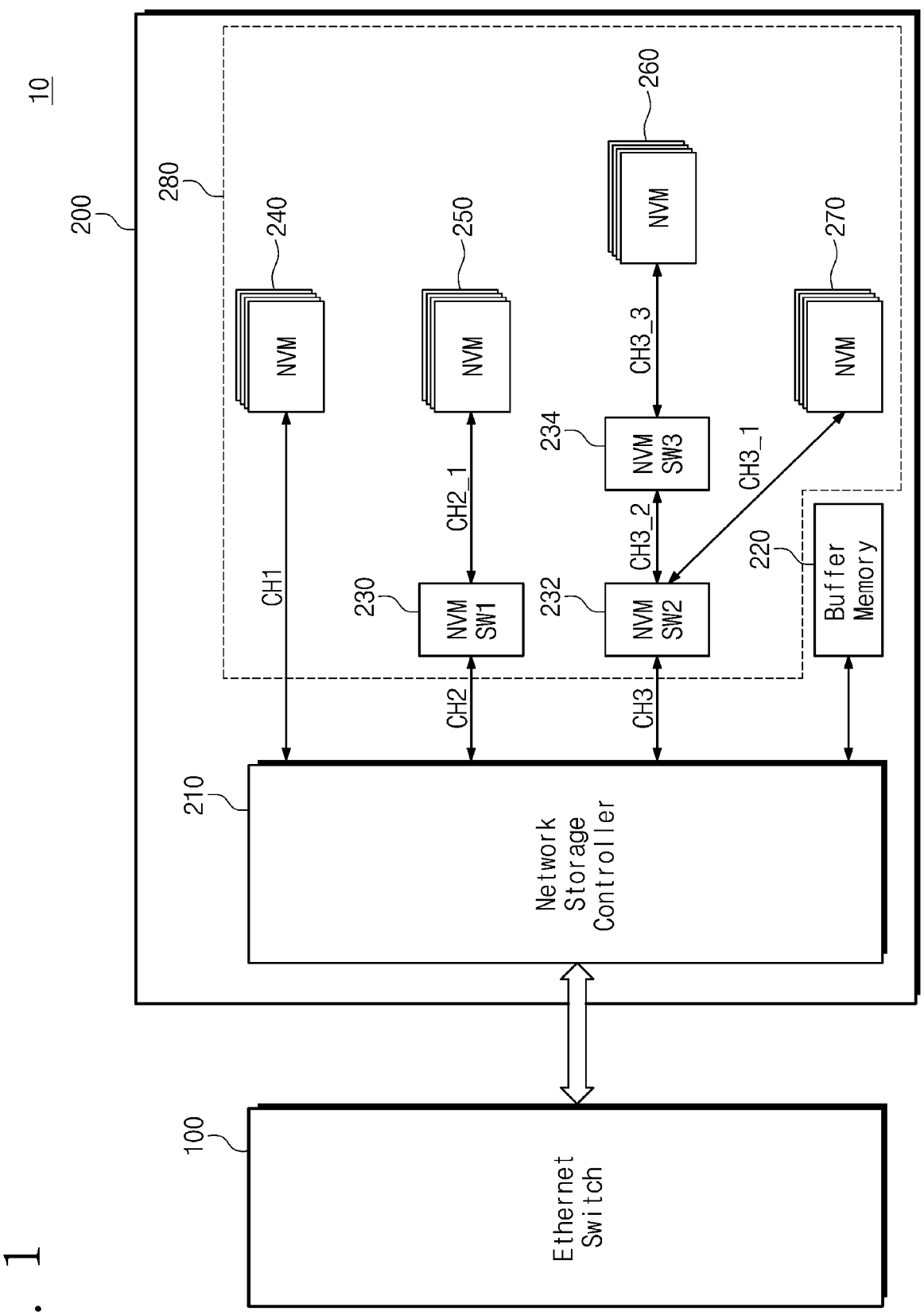
FIG. 1 illustrates a block diagram of a network storage system according to an embodiment of the inventive concepts.

FIG. 1 illustrates a block diagram of a network storage system according to an embodiment of the inventive concepts. Referring to FIG. 1, a network storage system 10 includes an Ethernet switch 100 and a network storage device 200. A host (not illustrated) transmits a command and data of an Ethernet protocol to the network storage device 200 through the Ethernet switch 100. The network storage device 200 translates the command and data of the Ethernet protocol into a command and data to be transmitted directly to an NVM cluster 280 without translation into an intermediate layer (e.g., an NVMe protocol).

The Ethernet switch 100 provides a command or data provided from the host to the network storage device 200. Alternatively, the Ethernet switch 100 transmits data, which the network storage device 200 provides depending on a request of the host, to the host. That is, the Ethernet switch 100 may be a network fabric or switch which uses an Ethernet protocol. When transmitting a command and data to the network storage device 200, the Ethernet switch 100 may transmit the command and the data in compliance with the Ethernet protocol including an NVMe-oF storage protocol. Also, the Ethernet switch 100 may exchange a response or data with the network storage device 200 in compliance with the Ethernet protocol.

The network storage device 200 controls the NVM cluster 280 in response to the command CMD or the data provided through the Ethernet switch 100. The NVM cluster 280 includes switches NVM SW1 230, NVM SW2 232 and NVM SW3 234 (which may hereinafter be referred to as NVM switches 230, 232, and 234), and nonvolatile memory devices 240, 250, 260, and 270. The network storage device 200 may directly translate a command or data of an Ethernet protocol format provided from the Ethernet switch 100 to a command or data format for controlling the nonvolatile memory devices (NVM) 240, 250, 260, and 270. For the purpose of performing the function, the network storage device 200 includes a network storage controller 210. In the network storage controller 210, transmission formats for supporting the Ethernet protocol, the NVMe-oF protocol, and the NVMe protocol may be processed at a single layer. Since the network transmission format may be managed at a single protocol layer (i.e., a single layer), the separation of a command path and a data path is possible. The network storage controller 210 may be implemented with a single chip. The network storage controller 210 provides interfacing between the Ethernet switch 100 and the network storage device 200. The network storage controller 210 may directly translate a command or data of a network transmission format provided from the Ethernet switch 100, for example, an Ethernet protocol format (e.g., a packet) to a command or data format to be applied to the nonvolatile memory devices 240, 250, 260, and 270. In the network storage controller 210, transmission formats for supporting the Ethernet protocol, the NVMe-oF protocol, and the NVMe protocol may be processed at a single layer. An operation of the network storage controller 210 will be more fully described later.

A buffer memory 220 may be used as a data buffer for data exchange between the network storage device 200 and the Ethernet switch 100. For example, the buffer memory 220 may be implemented with dynamic random access memory (DRAM). However, the buffer memory 220 is not limited to DRAM. For example, the buffer memory 220 may be implemented with volatile memory such as static RAM (SRAM) or synchronous DRAM (SDRAM), nonvolatile RAM NV-RAM, or a combination thereof.

The NVM cluster 280 includes the NVM switches 230, 232, and 234, and the nonvolatile memory devices 240, 250, 260, and 270. Here, each of the nonvolatile memory devices 240, 250, 260, and 270 may include a nonvolatile memory array (NVM array). That is, the nonvolatile memory device 240 may include one or more NAND flash memory devices, and the remaining nonvolatile memory devices 250, 260, and 270 may also be implemented or combined in a similar form.

The NVM switches 230, 232, and 234 are provided as a configuration for expansion-connecting a nonvolatile memory device to a flash interface of the network storage controller 210. For example, each of the NVM switches 230, 232, and 234 may independently perform address mapping on a nonvolatile memory device connected thereto. A structure of the NVM switches 230, 232, and 234 and nonvolatile memory devices connected with the NVM switches 230, 232, and 234 will be more fully described with reference to the following drawings.

According to the above description, the network storage device 200 of the inventive concepts includes the network storage controller 210 which may directly translate a network protocol into a command or data format for controlling a nonvolatile memory device. Accordingly, the network storage controller 210 may load/store a command and data transmitted from the network fabric to the nonvolatile memory devices 240, 250, 260, and 270 after being processed through a command path and a data path, which are separate from each other. Also, the nonvolatile memory devices 240, 250, 260, and 270 may be easily expanded by using an NVM switch.

Figure 2:
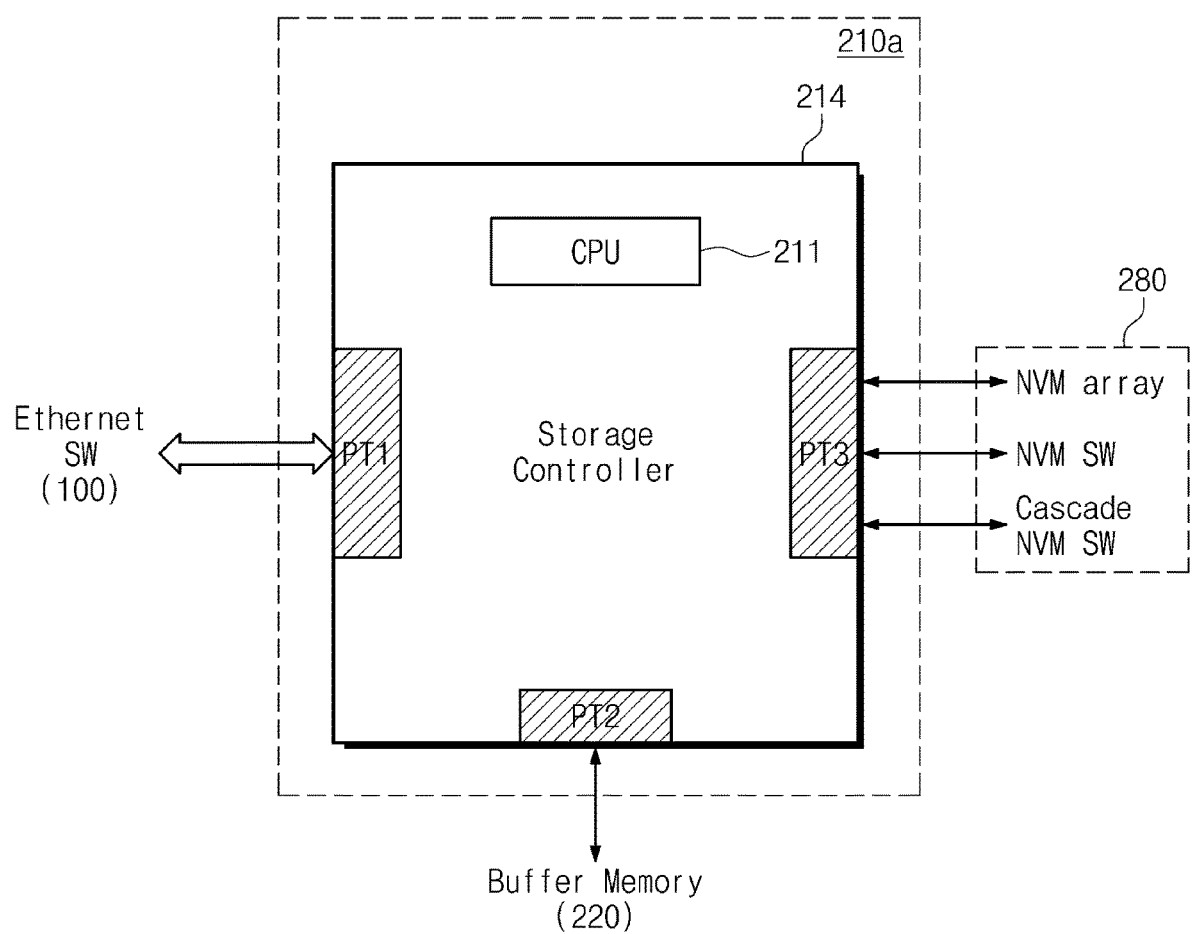
FIG. 2 illustrates a block diagram of an embodiment of a network storage controller of FIG. 1.

FIG. 2 illustrates a block diagram of an embodiment of a network storage controller of FIG. 1. Referring to FIG. 2, a network storage controller 210a according to an embodiment includes a storage controller 214.

The storage controller 214 performs interfacing between the Ethernet switch 100 and the NVM cluster 280 by using an embedded CPU (e.g., an embedded computing device) 211. In particular, the storage controller 214 is connected with the Ethernet switch 100 through a first port PT1. For example, the first port PT1 may perform a network interface function for connection with the Ethernet switch 100. The first port PT1 thus supports a network transmission format.

The storage controller 214 may exchange data with the buffer memory 220 through a second port PT2. The storage controller 214 is connected with the NVM cluster 280 through a third port PT3. Here, the third port PT3 may include a plurality of channels CH1, CH2, and CH3 as illustrated in FIG. 1. Through at least one of the channels CH1, CH2, and CH3 which the third port PT3 provides, the storage controller 214 may be directly connected with a nonvolatile memory (NVM) array (e.g., nonvolatile memory device 240 through channel CH1) of the NVM cluster 280. Alternatively, through at least one of the channels CH1, CH2, and CH3 which the third port PT3 provides, the storage controller 214 may be connected with the NVM switches 230 and 232. Alternatively, through at least one of the channels CH1, CH2, and CH3 which the third port PT3 provides, the storage controller 214 may be connected with cascade NVM switches (e.g., NVM switches 232 and 234).

Figure 3:
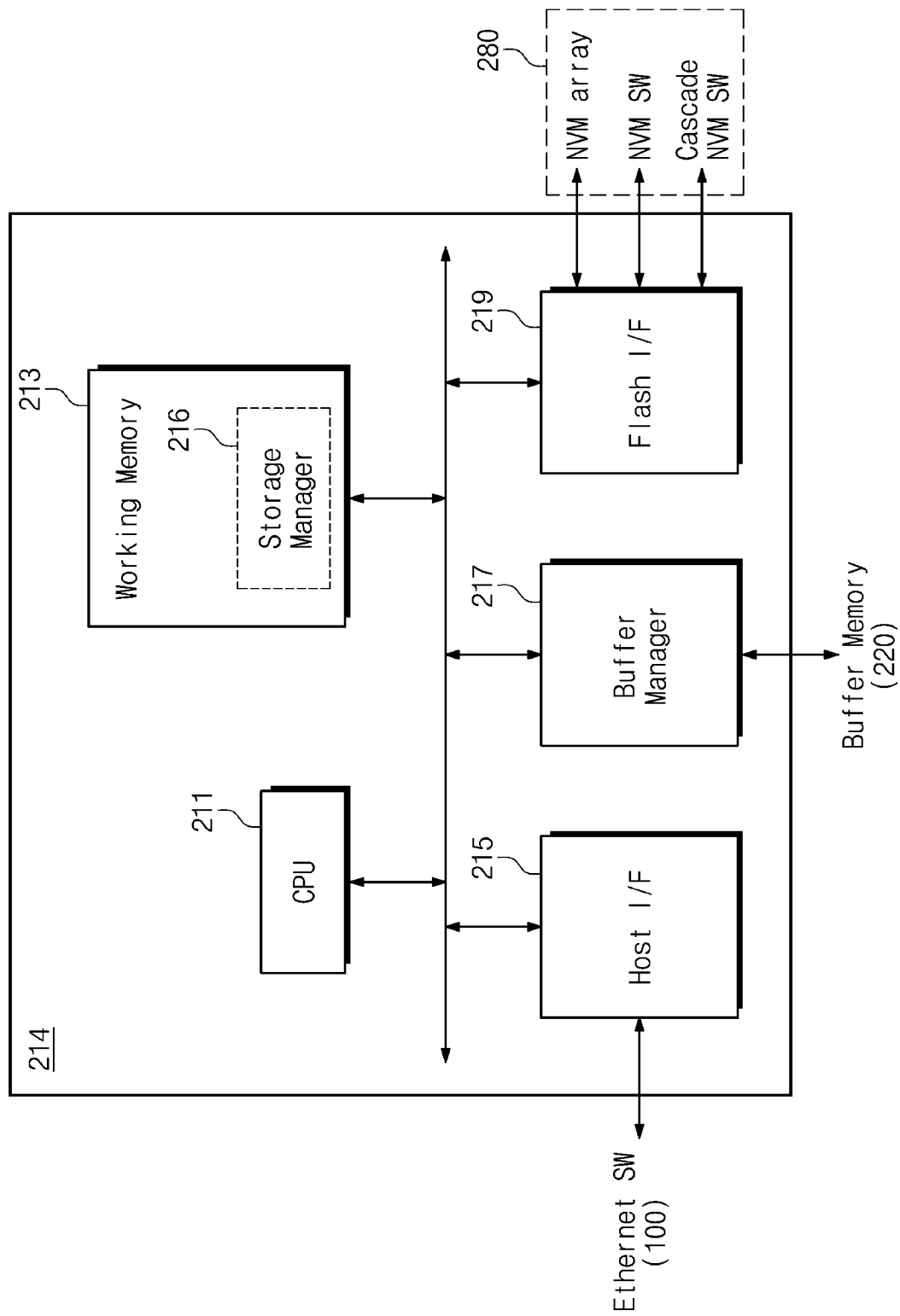
FIG. 3 illustrates a block diagram of a configuration of a storage controller of FIG. 2.

FIG. 3 illustrates a block diagram of an exemplary configuration of a storage controller of FIG. 2. Referring to FIG. 3, the storage controller 214 includes the embedded CPU 211, a working memory 213, a host interface (I/F) 215, a buffer manager 217, and a flash interface (I/F) 219.

The embedded CPU 211 may transmit a variety of control information, which is needed to perform a read/write operation associated with the NVM cluster 280, to registers of the host interface 215 and the flash interface 219. The embedded CPU 211 may operate based on firmware or an operating system OS provided for various control operations of the network storage controller 210. For example, the embedded CPU 211 may execute garbage collection for managing the NVM cluster 280, or a flash translation layer (FTL) for performing address managing, and wear leveling, among other various control operations. In particular, the embedded CPU 211 may call and execute a storage manager 216 loaded to the working memory 213.

As the storage manager 216 is executed, the embedded CPU 211 may process transmission formats for supporting the Ethernet protocol, the NVMe-oF protocol, and the NVMe protocol with respect to a command or data provided through the Ethernet switch 100, at a single layer. In addition, the embedded CPU 211 may load/store a command and data transmitted from a network fabric to the NVM cluster 280 after being processed through a command path and a data path, which are separate from each other.

The working memory 213 may be used as an operation memory, a cache memory, or a buffer memory of the embedded CPU 211. The working memory 213 may store codes and commands which the embedded CPU 211 executes. The working memory 213 may store data processed by the embedded CPU 211. In an embodiment, the working memory 213 may for example be implemented with static random access memory (SRAM). In particular, the storage manager 216 may be loaded to the working memory 213. When executed by the embedded CPU 211, the storage manager 216 may process translation of a transmission format of a command or data provided from the Ethernet switch 100 at a single layer. In addition, the storage manager 216 may process a command or data transmitted from the network fabric in a state where a command path and a data path are separated. In addition, the flash translation layer FTL or various memory management modules may be stored in the working memory 213.

The storage manager 216 may collect and adjust pieces of overall information about the NVM cluster 280. That is, the storage manager 216 may maintain and update a status or mapping information of data stored in the NVM cluster 280. Accordingly, even though an access request is made from the Ethernet switch 100, the storage manager 216 may provide requested data at high speed to the Ethernet switch 100 or may write write-requested data at high speed. In addition, since the storage manager 216 has the authority to manage a mapping table for managing an address of data, the storage manager 216 may perform data migration within the NVM cluster 280 or correction of mapping information if necessary.

The host interface 215 (e.g., the first port PT1) may communicate with the Ethernet switch 100. The host interface 215 may recognize a command of a network transmission format provided from the Ethernet switch 100. For example, the host interface 215 may communicate with the Ethernet switch 100 by using a communication protocol of a high-speed Ethernet system, such as a Fibre Channel™ or InfiniBand™. The host interface 215 may translate a command of a network transmission format transmitted from the Ethernet switch 100 and may provide the translated command to the flash interface 219. Alternatively, the host interface 215 may translate data provided through the flash interface 219 so as to include the network transmission format, and may transmit the translated data to the Ethernet switch 100.

The buffer manager 217 may control read and write operations of the buffer memory 220 (refer to FIG. 1). For example, the buffer manager 217 temporarily stores write data or read data in the buffer memory 220. The buffer manager 217 may classify and manage a memory area of the buffer memory 220 in units of streams under control of the embedded CPU 211.

The flash interface 219 exchanges data with the NVM cluster 280. The flash interface 219 writes data transmitted from the buffer memory 220 to the NVM cluster 280 through the respective memory channels CH1, CH2, and CH3. Read data which are read out from the NVM cluster 280 and provided through a memory channel may be collected by the flash interface 219. Afterwards, the collected data may be stored to the buffer memory 220.

The storage controller 214 of the above-described structure may translate a network protocol for communication with the Ethernet switch 100 directly to a command or data of a flash memory level. Accordingly, a command or data provided through the network fabric does not experience a plurality of sequential translation processes, which are performed through, for example, an Ethernet network interface card (NIC), a TCP/IP offload engine, and a PCIe switch. According to the above-described feature, a command or data transmitted from the Ethernet switch 100 may be loaded/stored to the NVM cluster 280 after being processed through a command path and a data path, which are separate from each other.

In particular, the storage controller 214 may be implemented with a single chip. As the storage controller 214 is implemented with a single chip, the network storage device 200 of the inventive concepts may be lightweight, thin, and small-sized. Accordingly, the network storage device 200 of the inventive concepts provides a low latency, high economic feasibility, and high expandability on the network fabric.

Figure 4:
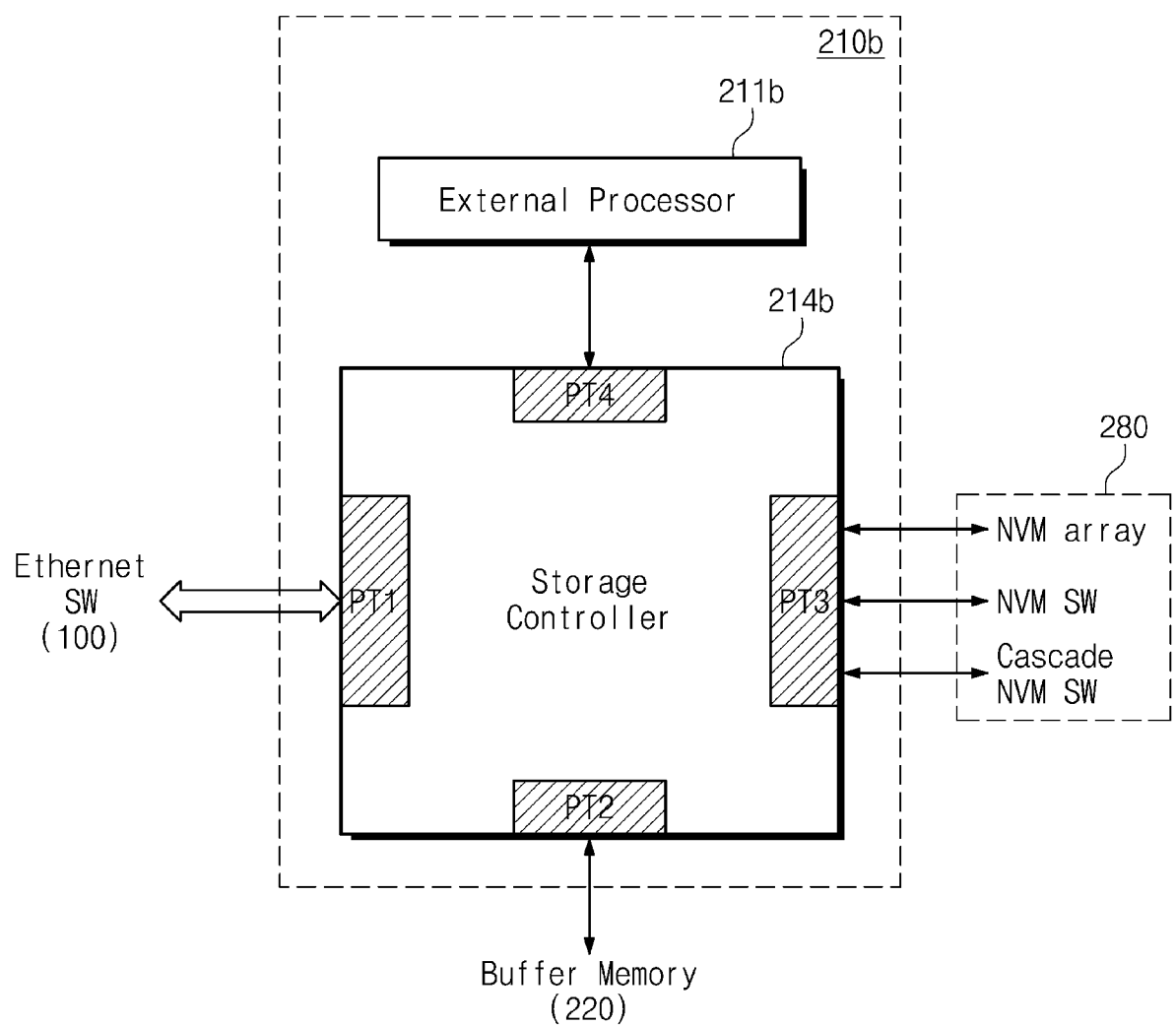
FIG. 4 illustrates a block diagram of another embodiment of a network storage controller of FIG. 1.

FIG. 4 illustrates a block diagram of another embodiment of a network storage controller of FIG. 1. Referring to FIG. 4, a network storage controller 210b according to another embodiment includes an external processor 211b and a storage controller 214b.

The storage controller 214b performs interfacing between the Ethernet switch 100 and the NVM cluster 280 by using the external processor (e.g., external computing device) 211b. The external processor 211b may translate a command or data of an Ethernet protocol transmitted from the Ethernet switch 100. In addition, the external processor 211b may control the storage controller 214b so as to search for data stored in the NVM cluster 280 or to output the found data to the Ethernet switch 100 depending on a request provided through the Ethernet switch 100. The external processor 211b may include one or more processors specialized for network management. The network storage controller 210b may include one or more external processors 211b.

The external processor 211b may perform functions of an embedded processor (not shown) included in the storage controller 214b, and may perform distributed processing of a workload with the embedded processor. In addition, the external processor 211b may perform processing of a separate operation requested from a host, such as network management.

The storage controller 214b is electrically connected with the Ethernet switch 100 through the first port PT1. The storage controller 214b may exchange data with the buffer memory 220 through the second port PT2. The storage controller 214b is connected with the NVM cluster 280 through the third port PT3. Here, the third port PT3 may include the plurality of channels CH1, CH2, and CH3 as illustrated in FIG. 1. In addition, the storage controller 214b is connected with the external processor 211b through a fourth port PT4. The storage controller 214b may for example perform an operation of translating a protocol (e.g., to provide a second command), an operation of searching for data stored in the NVM cluster 280, or an operation of loading/storing data to the NVM cluster 280 (e.g., based on the translated protocol), by using the external processor 211b. The fourth port PT4 may be implemented with a PCIe interface which may be connected with a plurality of processors. However, the inventive concepts are not limited thereto. The storage controller 214b may have a configuration and a function similar to those of the storage controller 214 of FIG. 3 except that the storage controller 214b is controlled by the external processor 211b. Here, the storage controller 214b may be implemented with one chip, and the network storage controller 210b may be implemented on one PCB board.

Figure 5:
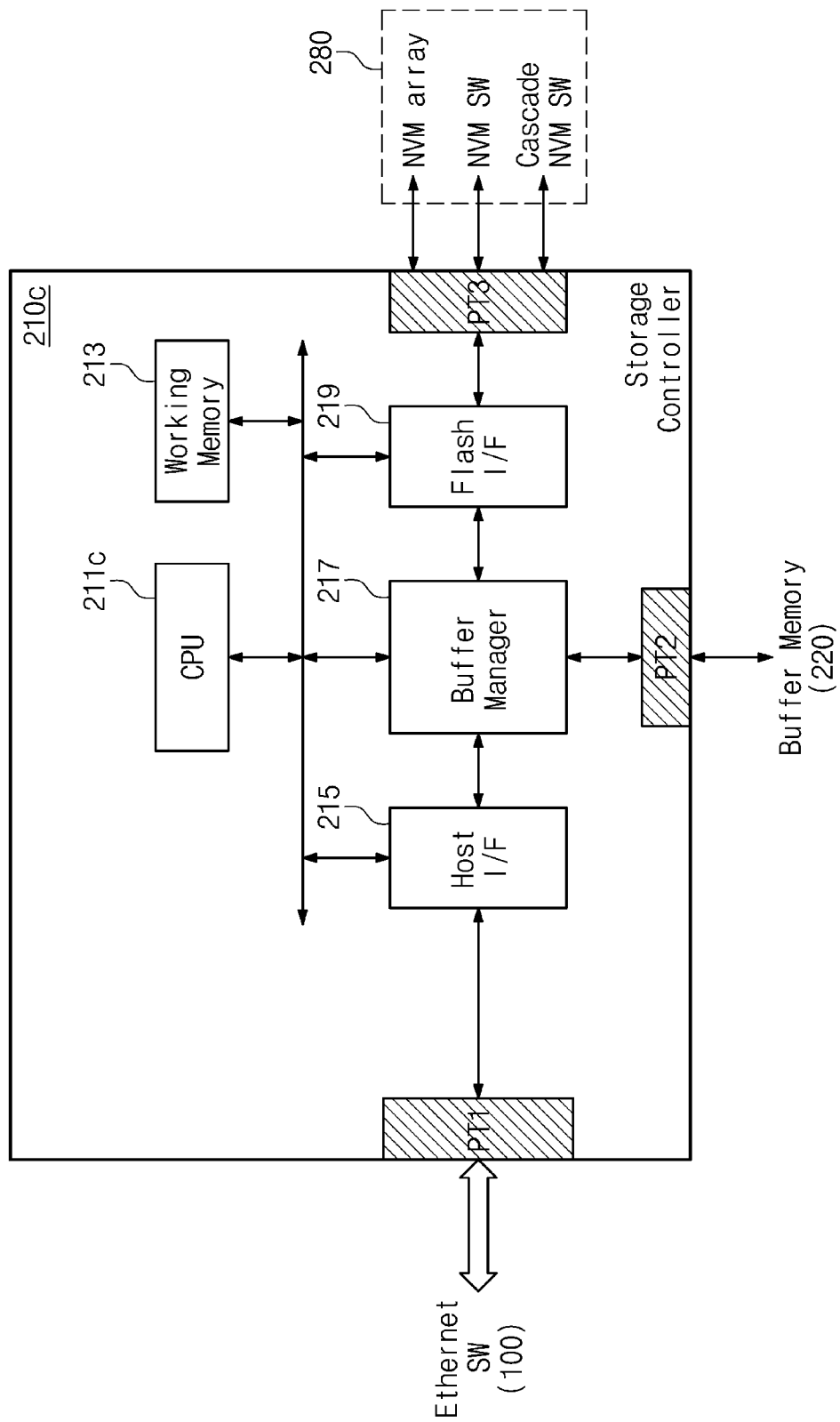
FIG. 5 illustrates a block diagram of a network storage controller according to another embodiment of the inventive concepts.

FIG. 5 illustrates a block diagram of a network storage controller 210c according to another embodiment of the inventive concepts. Referring to FIG. 5, a network storage controller 210c may be implemented with one chip.

The network storage controller 210c includes the first port PT1 connected with the Ethernet switch 100. The first port PT1 may be a hardware port for connecting the network storage controller 210c with a high-speed Ethernet system such as a Fibre Channel™ or InfiniBand™. The first port PT1 may transmit a command or data of the Ethernet protocol to the host interface 215. The host interface 215 may perform communication with the Ethernet switch 100 in compliance with the Ethernet protocol. For example, the communication protocol of the high-speed Ethernet system, such as a Fibre Channel™ or InfiniBand™, may be translated to a transmission format for controlling the NVM cluster 280 by the host interface 215.

The buffer manager 217 may control read and write operations of the buffer memory 220 (refer to FIG. 1) through the second port PT2. For example, the buffer manager 217 temporarily stores write data or read data to the buffer memory 220. The buffer manager 217 may classify and manage a memory area of the buffer memory 220 in units of streams under control of an embedded CPU 211c.

The flash interface 219 exchanges data with the NVM cluster 280 through the third port PT3. The flash interface 219 writes data transmitted from the buffer memory 220 to the NVM cluster 280 through respective channels. Read data which are read out from the NVM cluster 280 and are provided through a memory channel may be collected by the flash interface 219. Afterwards, the collected data may be stored in the buffer memory 220.

The embedded CPU 211c may transmit a variety of control information, which is needed to perform a read/write operation associated with the NVM cluster 280, to registers of the host interface 215 and the flash interface 219. The embedded CPU 211c may operate based on firmware or an operating system OS provided for various control operations of the network storage controller 210c. For example, the embedded CPU 211c may execute garbage collection for managing the NVM cluster 280, or a flash translation layer (FTL) for performing address managing, and wear leveling, among various other control operations. In particular, the embedded CPU 211c may call and execute an operating system OS or a management module loaded to the working memory 213. The embedded CPU 211c may process transmission formats for supporting the Ethernet protocol, the NVMe-oF protocol, and the NVMe protocol with respect to a command or data provided to the network storage controller 210c, at a single layer.

As described above, the network storage controller 210c according to another embodiment may directly perform network interfacing and may include the embedded CPU 211c. Accordingly, the network storage controller 210c may be directly connected to the Ethernet switch 100 and may control the NVM cluster 280.

Figure 6:
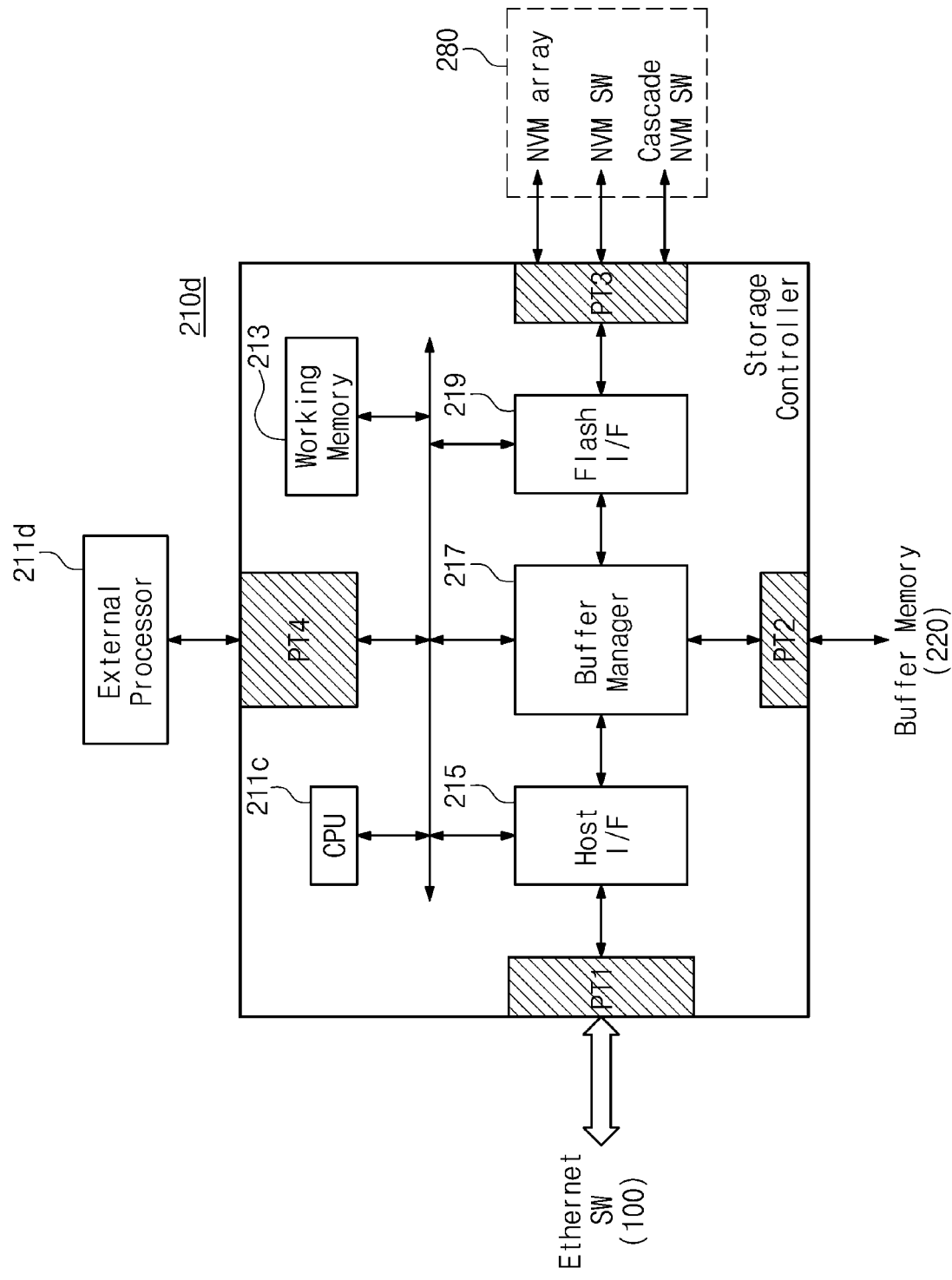
FIG. 6 illustrates a block diagram of a network storage controller according to another embodiment of the inventive concepts.

FIG. 6 illustrates a block diagram of a network storage controller 210d according to another embodiment of the inventive concepts. Referring to FIG. 6, the network storage controller 210d may perform interfacing between the NVM cluster 280 and the Ethernet switch 100 by using an external processor (e.g., an external computing device) 211d. In an embodiment, the network storage controller 210d may perform interfacing between the NVM cluster 280 and the Ethernet switch 100 by using one or more external processors (e.g., an external computing devices) 211d.

The network storage controller 210d includes the first port PT1 connected with the Ethernet switch 100. The first port PT1 may be a hardware port for connecting the network storage controller 210d with a high-speed Ethernet system such as a Fibre Channel™ or InfiniBand™. The first port PT1 may receive a command or data of the Ethernet protocol from the Ethernet switch 100. The first port PT1 transmits the received command or data to the host interface 215. Here, the embedded CPU 211c, the working memory 213, the host interface 215, the buffer manager 217, the flash interface 219, the first port PT1, the second port PT2 and the third port PT3 may be configured the same as those of FIG. 5.

In contrast, the network storage controller 210d may perform interfacing between the Ethernet switch 100 and the NVM cluster 280 by using the external processor 211d. The external processor 211d may translate a command (e.g., a first command) or data of the Ethernet protocol transmitted from the Ethernet switch 100 into a second command. In addition, the external processor 211d may control the network storage controller 210d so as to search for data stored in the NVM cluster 280 or to output the found data to the Ethernet switch 100 depending on a request provided from the Ethernet switch 100. The external processor 211d may perform distributed processing on a workload with the embedded CPU 211c. In an embodiment, the external processor 211d may process an assigned command (e.g., a second command) under control of the embedded CPU 211c. In addition, the external processor 211d may perform processing of a separate operation requested from a host, such as network management. The external processor 211d may include one or more processors. The fourth port PT4 for connecting the external processor 211d and the network storage controller 210d is provided. The external processor 211d and the network storage controller 210d may communicate with each other through the fourth port PT4, for example, supporting a PCIe interface.

Figure 7:
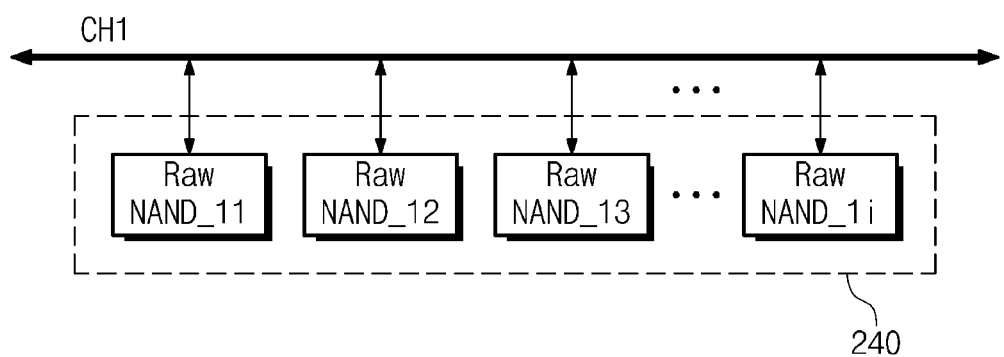
FIG. 7 illustrates a diagram of a part of an NVM cluster of the inventive concepts.

FIG. 7 illustrates a diagram of a part of an NVM cluster of the inventive concepts. Referring to FIG. 7, the NVM array 240 may be directly connected with the network storage controller 210 such as shown in FIG. 1 for example, and may exchange data.

The NVM array 240 includes, for example, NAND flash memory devices Raw NAND_11, Raw NAND_12, Raw NAND_13, . . . , Raw NAND_1i (i being a natural number greater than 3). The NAND flash memory devices Raw NAND_11, Raw NAND_12, Raw NAND_13, . . . , Raw NAND_1i may be a combination of single devices or may be provided in the form of one package in which a plurality of devices are included. Each of the NAND flash memory devices Raw NAND_11, Raw NAND_12, Raw NAND_13, . . . , Raw NAND_1i do not include a separate interface or switch between the first channel CH1 and a device. Also, a raw NAND flash memory device does not perform memory management functions, in contrast to a managed NAND flash memory device which may include a memory controller that performs some memory management functions.

Each of the NAND flash memory devices Raw NAND_11, Raw NAND_12, Raw NAND_13, . . . , Raw NAND_1i is connected with the first channel CH1. For example, the first channel CH1 may be a data path between the network storage controller 210 and the NAND flash memory devices Raw NAND_11, Raw NAND_12, Raw NAND_13, . . . , Raw NAND_1i sharing the same data line DQ. That is, the NAND flash memory devices Raw NAND_11, Raw NAND_12, Raw NAND_13, . . . , Raw NAND_1i connected with the first channel CH1 may share the same data line DQ. Through the first channel CH1, the flash interface 219 (refer FIG. 3 for example) of the network storage controller 210 may select any one of the NAND flash memory devices Raw NAND_11, Raw NAND_12, Raw NAND_13, . . . , Raw NAND_1i or may control channel-way interleaving.

Figure 8:
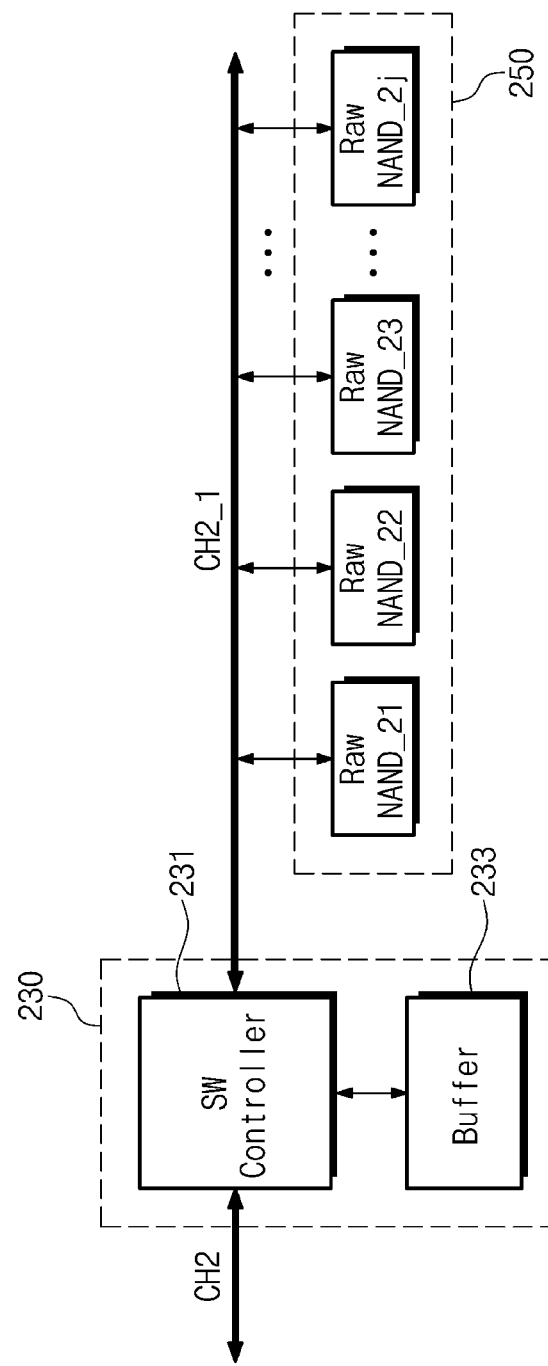
FIG. 8 illustrates a diagram of another part of an NVM cluster of the inventive concepts.

FIG. 8 illustrates a diagram of another part of an NVM cluster of the inventive concepts. Referring to FIG. 8, the NVM array 250 is connected with the network storage controller 210 through the NVM switch 230, such as shown in FIG. 1 for example.

The NVM switch 230 communicates with the network storage controller 210 through the second channel CH2. For example, the NVM switch 230 may be connected with the flash interface 219 (refer to FIG. 3 for example) of the network storage controller 210 through the second channel CH2. The flash interface 219 may access the NVM switch 230 and the NVM array 250 by using the second channel CH2 which is independent of the first channel CH1.

In an embodiment of the inventive concepts, the NVM switch 230 includes a switch (SW) controller 231 and a buffer 233. The switch controller 231 may perform an address mapping function for mapping an address provided through the second channel CH2 onto an actual address of the NVM array 250. The switch controller 231 may map an address of the NVM array 250 connected with a memory channel CH2_1 onto an address which the flash interface 219 provides. The switch controller 231 may also update address mapping when a device is added to or removed from the NVM array 250. The buffer 233 may temporarily store data exchanged between the network storage controller 210 and the NVM array 250. The buffer 233 may be implemented with, for example, volatile memory such as a DRAM.

The NVM array 250 includes, for example, NAND flash memory devices Raw NAND_21, Raw NAND_22, Raw NAND_23, . . . , Raw NAND_2j (i being a natural number greater than 3). Each of the NAND flash memory devices Raw NAND_21, Raw NAND_22, Raw NAND_23, . . . , Raw NAND_2j may be selected under control of the switch controller 231. Each of the NAND flash memory devices Raw NAND_21, Raw NAND_22, Raw NAND_23, . . . , Raw NAND_2j do not include a separate interface or switch between the memory channel CH2_1 and a device. The NAND flash memory devices Raw NAND_21, Raw NAND_22, Raw NAND_23, . . . , Raw NAND_2j may be a combination of single devices or may be provided in the form of one package in which a plurality of devices are included.

Each of the NAND flash memory devices Raw NAND_21, Raw NAND_22, Raw NAND_23, . . . , Raw NAND_2j is connected with the memory channel CH2_1. For example, the memory channel CH2_1 may be a data path between the NVM switch 230 and the NAND flash memory devices Raw NAND_21, Raw NAND_22, Raw NAND_23, . . . , Raw NAND_2j sharing the same data line DQ. That is, the NAND flash memory devices Raw NAND_21, Raw NAND_22, Raw NAND_23, . . . , Raw NAND_2j connected with the memory channel CH2_1 may share the same data line DQ.

An example in which the NAND flash memory devices Raw NAND_21, Raw NAND_22, Raw NAND_23, . . . , Raw NAND_2j are connected with the network storage controller 210 through the NVM switch 230 is described above. Here, a description is given as one memory channel CH2_1 is provided in the NVM switch 230. However, it should be understood that the inventive concept s are not limited thereto. That is, it should be understood that in other embodiments two or more memory channels may be connected with the NVM switch 230 and a plurality of NVM arrays may be connected with the memory channels.

There is a substantial limitation on expansion of an SSD through a PCIe switch. However, theoretically, there is no limitation in expanding the NAND flash memory devices Raw NAND_21, Raw NAND_22, Raw NAND_23, . . . , Raw NAND_2j of a device unit through the NVM switch 230. Accordingly, in the case of using the technology of the inventive concepts, the capacity of the network storage device 200 may be easily expanded.

Figure 9:
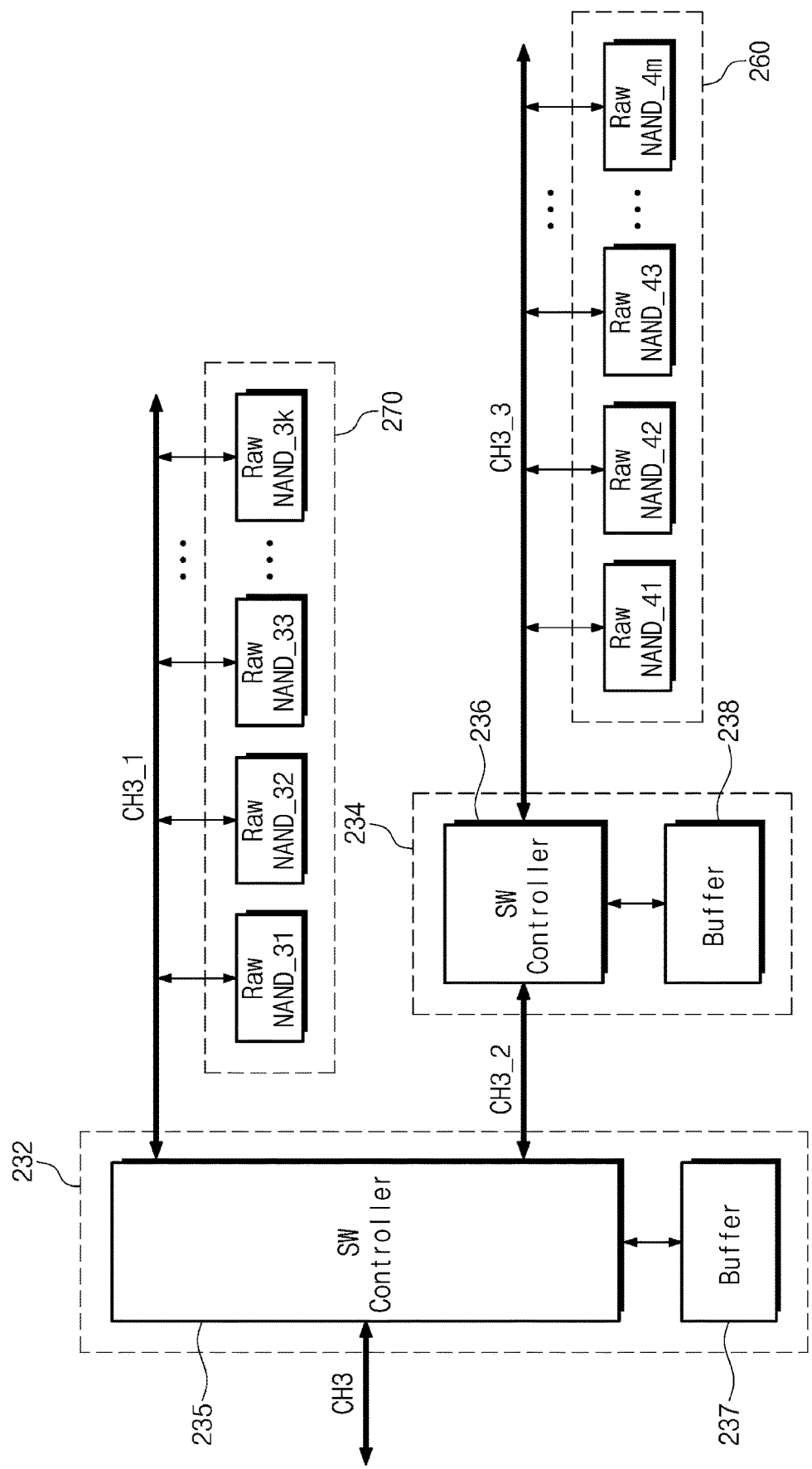
FIG. 9 illustrates a diagram of another part of an NVM cluster of the inventive concepts.

FIG. 9 illustrates a diagram of another part of an NVM cluster of the inventive concepts. Referring to FIG. 9, the NVM arrays 260 and 270 are be connected with the network storage controller 210 through the NVM switches 232 and 234 such as shown in FIG. 1 for example. Here, the NVM switches 232 and 234 may have a cascade connection structure.

The NVM switch 232 is connected with the network storage controller 210 through the third channel CH3. The NVM switch 232 is connected with the flash interface 219 (refer to FIG. 3) of the network storage controller 210 through the third channel CH3. The flash interface 219 may access the NVM switch 232 by using the third channel CH3 which is independent of the first channel CH1 and the second channel CH2.

In an embodiment of the inventive concepts, the NVM switch 232 includes a switch controller 235 and a buffer 237. The switch controller 235 may perform an address mapping function for mapping an address provided through the third channel CH3 onto addresses of the NVM array 270 and the NVM switch 234 connected in the cascade with the NVM switch 232. The switch controller 235 may map an address of the NVM array 270 connected with a memory channel CH3_1 onto an address which the flash interface 219 provides. The switch controller 235 may map an address of the NVM switch 234 connected with a memory channel CH3_2 onto an address which the flash interface 219 provides.

The NVM switch 234 is connected with the NVM switch 232 through the memory channel CH3_2. The NVM switch 234 is connected with the NVM array 260 through a memory channel CH3_3. The NVM switch 234 includes a switch controller 236 and a buffer 238.

The switch controller 235 or the switch controller 236 may recognize an additional NVM array or NVM switch through an added memory port (memory channel) and may perform interfacing. Here, the NAND flash memory devices Raw NAND_31, Raw NAND_32, Raw NAND_33, . . . , Raw NAND_3$k$ and Raw NAND_41, Raw NAND_42, Raw NAND_43, . . . , Raw NAND_4$m$ constituting the NVM arrays 260 and 270 may be a combination of single devices or may be provided in the form of a package including a plurality of devices. Each of the NAND flash memory devices Raw NAND_31, Raw NAND_32, Raw NAND_33, . . . , Raw NAND_3$k$ and Raw NAND_41, Raw NAND_42, Raw NAND_43, . . . , Raw NAND_4$m$ do not include a separate interface or switch between the corresponding memory channel CH3_1 and memory channel CH3_3 and a device.

An example in which the NVM arrays 240, 250, 260, and 270 are connected with the network storage controller 210 through the NVM switches 230, 232, and 234 are described above. Here, the NVM switches 230, 232, and 234 may be connected in cascade, and may be connected with a single NVM product or an array unit, not an SSD unit. There is a limitation on expansion of an SSD through a PCIe switch. However, theoretically, there is no limitation in expanding storage capacity in a device unit through the NVM switches 230, 232, and 234. Accordingly, in the case of using the technology of the inventive concepts, the capacity of the network storage device 200 may be easily expanded.

Figure 10:
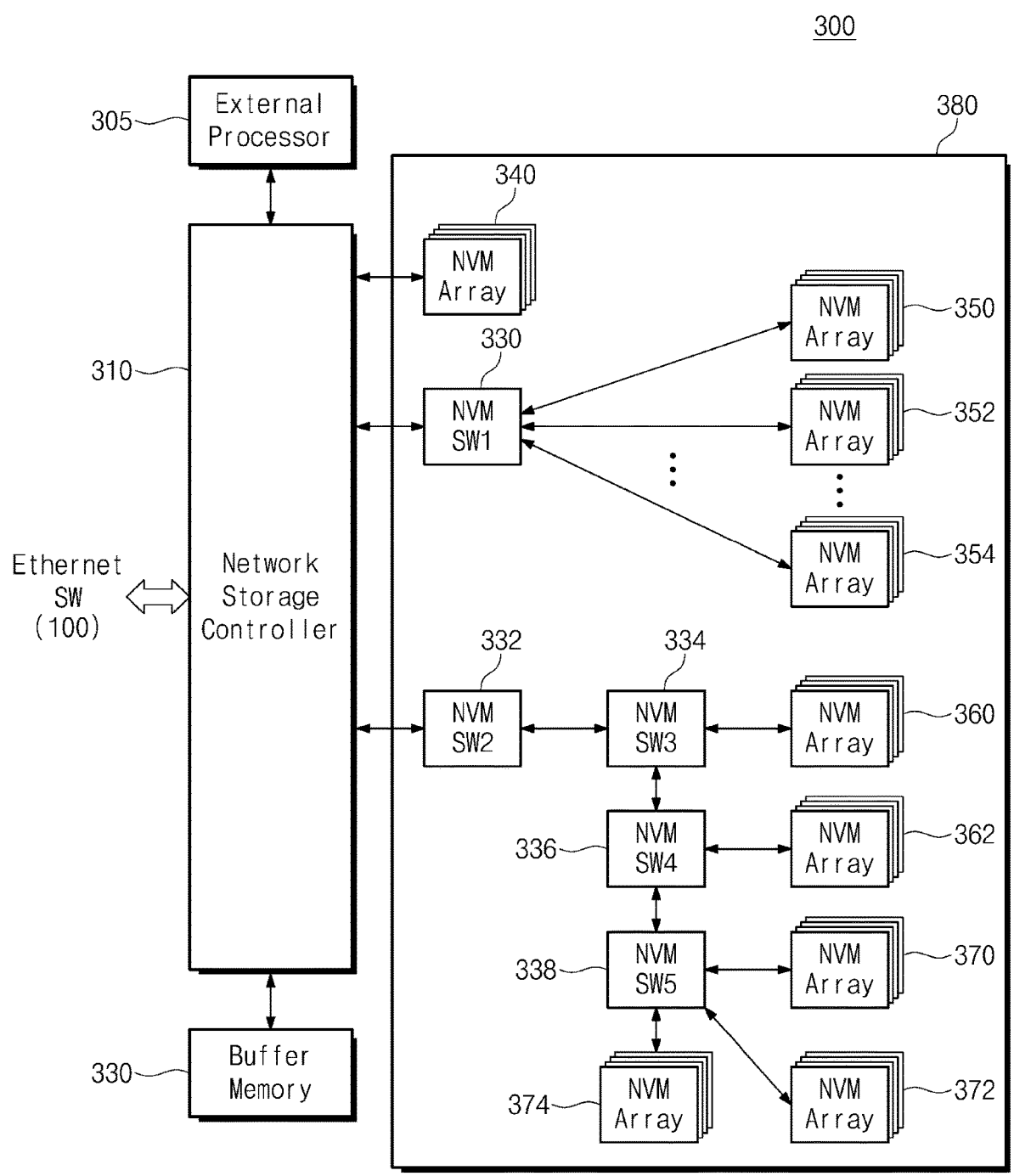
FIG. 10 illustrates a block diagram of a network storage system configurable according to an embodiment of the inventive concepts.

FIG. 10 illustrates a block diagram of a network storage system configurable according to an embodiment of the inventive concepts. Referring to FIG. 10, a network storage device 300 includes a network storage controller 310 for performing interfacing with the Ethernet switch 100, an external processor 305, a buffer memory 330, and a NVM cluster 380. The external processor (e.g., external computing device) 305 may be implemented with a processor or a computing device provided for a specific purpose, or an acceleration engine.

A host (not illustrated) such as a server or a data center transmits a command and data of the Ethernet protocol to the network storage device 300 through the Ethernet switch 100. The network storage device 300 may translate the command and data of the Ethernet protocol into a command and data to be transmitted to the NVM cluster 380 without translation into a PCIe protocol.

The network storage controller 310 controls the direct NVM cluster 380 in response to the command or the data of the Ethernet protocol provided through the Ethernet switch 100. In particular, the network storage controller 310 may be controlled by the external processor 305. It should be understood that the external processor 305 may be implemented with one or more processors for the purpose of exchanging data with the high-capacity NVM cluster 380 and processing data or a command That is, the network storage device 300 may include one or more external processors 305. The external processor 305 may be implemented with an embedded CPU within the network storage controller 310.

In the network storage controller 310, transmission formats for supporting the Ethernet protocol, the NVMe-oF protocol and the NVMe protocol may be processed at a single layer. The network storage controller 310 provides interfacing between the Ethernet switch 100 and the network storage device 300. The network storage controller 310 may directly translate a command or data of the Ethernet protocol format (e.g., a packet) provided from the Ethernet switch 100 to a command or data format to be applied to the NVM cluster 380.

The buffer memory 330 may be used as a data buffer for data exchange between the network storage device 300 and the Ethernet switch 100. For example, the buffer memory 330 may be implemented with DRAM. However, the buffer memory 330 is not limited to DRAM. For example, the buffer memory 330 may be implemented with volatile memory such as SRAM or SDRAM, nonvolatile RAM NV-RAM, or a combination thereof.

The NVM cluster 380 may include one or more NVM switches 330, 332, 334, 336, and 338 and one or more NVM arrays 340, 350, 352, 354, 360, 362, 370, 372, and 374. Here, each of the NVM arrays 340, 350, 352, 354, 360, 362, 370, 372, and 374 may be implemented with an array of nonvolatile memory devices. That is, each of the NVM arrays 340, 350, 352, 354, 360, 362, 370, 372, and 374 may include a plurality of NAND flash memory devices.

The NVM switches 330, 332, 334, 336, and 338 are provided as a configuration for expansion-connecting a nonvolatile memory device to a flash interface of the network storage controller 310. For example, each of the NVM switches 330, 332, 334, 336, and 338 may independently perform address mapping on a nonvolatile memory device or a nonvolatile memory device array, which is connected thereto.

The NVM switch 330 is connected with the three NVM arrays 350, 352, and 354 and may perform interfacing with the network storage controller 310. The NVM switch 332 may perform interfacing between the NVM switch 334 and the network storage controller 310. The NVM switch 334 may control the NVM switch 336 and the NVM array 360. The NVM switch 336 may control the NVM switch 338 and the NVM array 362. The NVM switch 338 is connected with the three NVM arrays 370, 372, and 374 and may perform interfacing with the NVM switch 336.

A connection form of the NVM switches 330, 332, 334, 336, and 338, which may be connected with the network storage controller 310, and the NVM arrays 340, 350, 352, 354, 360, 362, 370, 372, and 374 is briefly described above. It should be well understood that the connection with the network storage controller 310 may be made without an NVM switch, such as for example the NVM array 340 connected to the network storage controller 310.

Figure 11:
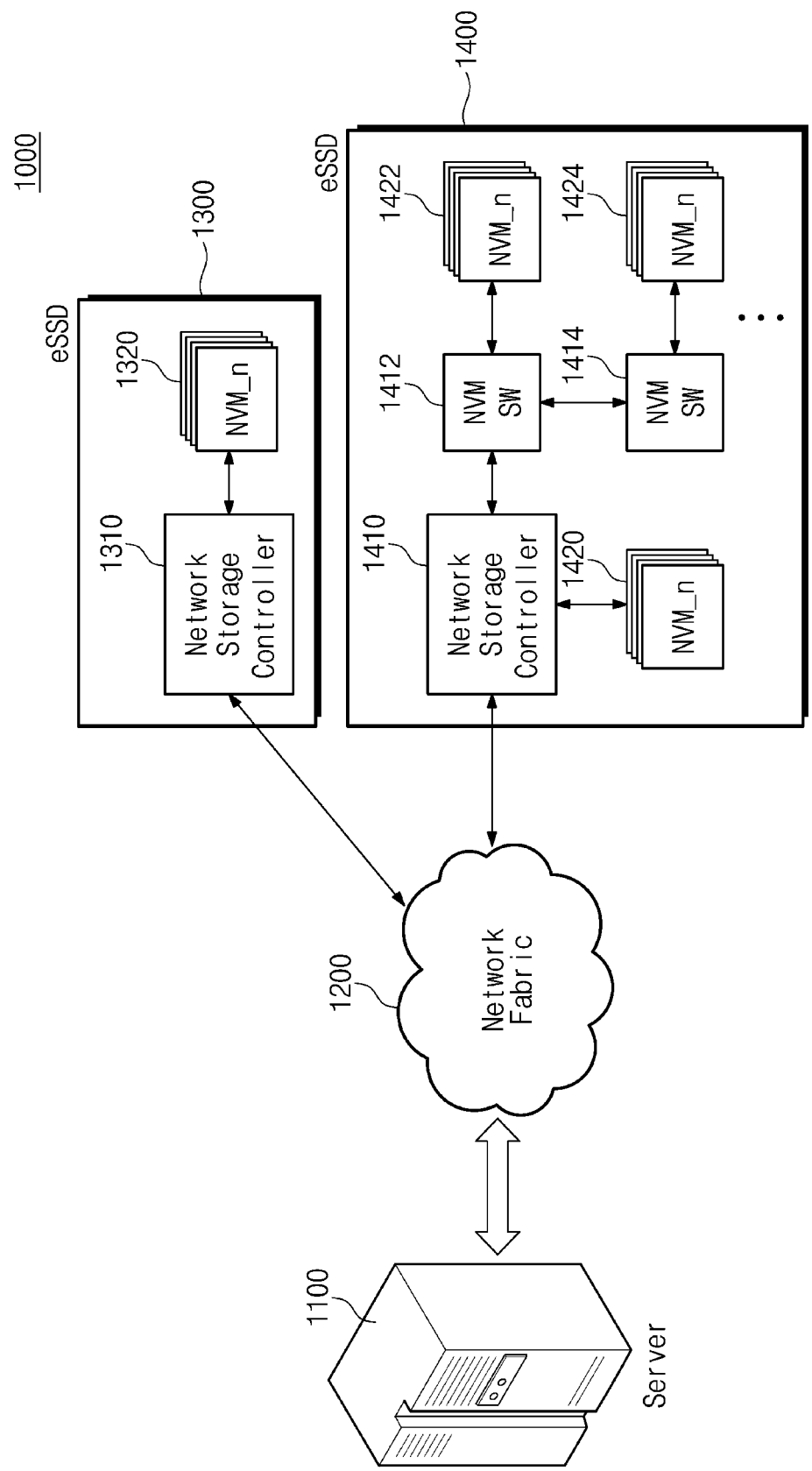
FIG. 11 illustrates a block diagram of a network storage system according to an embodiment of the inventive concepts.

FIG. 11 illustrates a block diagram of a network storage system according to an embodiment of the inventive concepts. Referring to FIG. 11, a network storage system 1000 of the inventive concepts includes a server 1100, a network fabric 1200, and a plurality of Ethernet SSDs 1300 and 1400.

The server 1100 is connected with the plurality of Ethernet SSDs 1300 and 1400 through the network fabric 1200. The server 1100 may transmit a command and data to the plurality of Ethernet SSDs 1300 and 1400 by using the Ethernet protocol. The server 1100 may receive data of the Ethernet protocol provided from at least one of the plurality of Ethernet SSDs 1300 and 1400. The network fabric 1200 may be a network switch.

Each of the plurality of Ethernet SSDs 1300 and 1400 may be implemented with a storage device of FIG. 1 or 10. That is, in the Ethernet SSD 1300, a network storage controller 1310 may be directly connected with an NVM array 1320 without passing through an NVM switch. In contrast, a network storage controller 1410 included in the Ethernet SSD 1400 may control NVM arrays 1422 and 1424 through NVM switches 1412 and 1414. Also, the Ethernet SSD controller 1410 may control the NVM array 1420 directly without using an NVM switch.

According to embodiments of the inventive concepts, a network storage device, the capacity of which may be expanded in units of nonvolatile memory devices or nonvolatile memory arrays such as NAND flash memory devices, may be provided. Accordingly, the network storage device of the inventive concepts may be connected with a network fabric to perform protocol translation of a single layer with respect to multiple protocols, thus reducing latency and enabling expanding of memory capacity.

While the inventive concepts have been described with reference to exemplary embodiments thereof, it should be apparent to those of ordinary skill in the art that various changes and modifications may be made thereto without departing from the spirit and scope of the inventive concepts as set forth in the following claims.

What is claimed is:

1. A network storage device connected with a network fabric, the network storage device comprising:
  a buffer memory configured as a data buffer for exchanging data between the network storage device and the network fabric;
  a network storage controller configured to perform interfacing with the network fabric, and to translate and process a command provided through the network fabric, and implemented with a single chip; and
  a nonvolatile memory cluster configured to exchange data with the network storage controller under control of the network storage controller,
  wherein the network storage controller includes a storage controller configured to be connected with the network fabric through a first port, to exchange data with the buffer memory through a second port, and to be connected with the nonvolatile memory cluster through a third port, wherein the third port includes a plurality of channels,
  wherein the nonvolatile memory cluster comprises
    a first nonvolatile memory array directly connected with the network storage controller through a first channel of the plurality of channels,
    a nonvolatile memory switch connected with the network storage controller through a second channel of the plurality of channels, and
    a second nonvolatile memory array configured to communicate with the network storage controller under control of the nonvolatile memory switch, and
  wherein the network storage controller is configured to translate a first command provided from the network fabric as the command into a second command for controlling the nonvolatile memory cluster, and supports a network transmission format comprising a high-speed Ethernet system, and
  wherein the network storage controller processes the network transmission format for supporting an Ethernet protocol, an NVMe-oF protocol, and an NVMe protocol at a single layer.

2. The network storage device of claim 1, wherein the first command includes the network transmission format.

3. The network storage device of claim 1, wherein the network storage controller is configured to perform an operation for the nonvolatile memory cluster based on the second command.

4. The network storage device of claim 1, wherein the first port comprises an interface which supports the network transmission format.

5. The network storage device of claim 1, wherein the storage controller is configured to translate the first command provided from the network fabric as the command into the second command, and to control the nonvolatile memory cluster based on the second command,
  the network storage controller further comprising an external computing device configured to perform an operation for the nonvolatile memory cluster based on the first command or the second command depending on a request of the storage controller.

6. The network storage device of claim 5, wherein the external computing device comprises one or more processors or an acceleration engine, and is configured to perform one of distributed processing with the storage controller and processing independent of the storage controller based on the first command or the second command.

7. The network storage device of claim 1, wherein the network storage controller comprises:
  a host interface configured to receive the first command provided from the network fabric as the command;
  a computing device configured to translate the first command into the second command for controlling the nonvolatile memory cluster and to perform an operation for the nonvolatile memory cluster based on the second command; and
  an interface configured to access the nonvolatile memory cluster under control of the computing device.

8. A network storage device comprising:
  a buffer memory configured as a data buffer for exchanging data between the network storage device and a network fabric;
  a network storage controller configured to translate a first command provided through a network switch into a second command for controlling a nonvolatile memory and to output the second command by using an interface, and implemented with a single chip; and a nonvolatile memory cluster comprising the nonvolatile memory and configured to store write data depending on the second command output from the network storage controller or to output stored data to the network storage controller, wherein the network storage controller comprises a storage controller and one or more external computing devices disposed externally of the storage controller, the one or more external computing devices configured to perform an operation for the nonvolatile memory cluster based on the second command, wherein the storage controller is configured to be connected with the network switch through a first port, to exchange data with the buffer memory through a second port, and to be connected with the nonvolatile memory cluster through a third port, wherein the third port includes a plurality of channels, wherein the first command has a network transmission format, and the second command has a format for controlling the nonvolatile memory, and wherein the network storage controller processes the network transmission format for supporting an Ethernet protocol, an NVMe-oF protocol, and an NVMe protocol at a single layer.

9. The network storage device of claim 8, wherein the one or more external computing devices include one or more processors which process a command according to a request of a host, the command comprising either the first command or the second command.

10. The network storage device of claim 9, wherein the one or more external computing devices perform a network management operation according to the request of the host.

11. The network storage device of claim 8, wherein the storage controller comprises an embedded computing device, and wherein the one or more external computing devices include one or more processors configured to perform distributed processing with the embedded computing device based on the first command or the second command.

12. The network storage device of claim 8, wherein the nonvolatile memory cluster comprises a first nonvolatile memory array directly connected with the network storage controller through a first channel and controlled through the interface.

13. The network storage device of claim 12, wherein the nonvolatile memory cluster further comprises:
   a second nonvolatile memory array; and
   a first nonvolatile memory switch connected with the network storage controller through a second channel and configured to perform interfacing between the second nonvolatile memory array and the interface.

14. The network storage device of claim 13, wherein the first nonvolatile memory switch comprises:
   a first switch controller configured to map a first address provided from the interface onto the second nonvolatile memory array; and
   a first buffer configured to buffer data transmitted between the interface and the second nonvolatile memory array.

15. The network storage device of claim 14, wherein the nonvolatile memory cluster further comprises:
   a third nonvolatile memory array; and
   a second nonvolatile memory switch configured to perform interfacing between the first nonvolatile memory switch and the third nonvolatile memory array.

16. The network storage device of claim 15, wherein the first and second nonvolatile memory switches perform address mapping independently of each other.

* * * * *